(12) United States Patent
Steele (10) Patent No.: US 10,952,424 B2
(45) Date of Patent: Mar. 23, 2021

(54) INSECT AND ANIMAL TRAPPING DEVICE (71) Applicant: James Steele, Troon (GB)

(72) Inventor: James Steele, Troon (GB)

( * ) Notice: Subject to any disclaimer, the term of this patent is extended or adjusted under 35 U.S.C. 154(b) by 319 days.

(21) Appl. No.: 16/073,776

(22) PCT Filed: Jan. 30, 2017

(86) PCT No.: PCT/GB2017/050230
§ 371 (c)(1),
(2) Date: Jul. 30, 2018

(87) PCT Pub. No.: WO2017/130006
PCT Pub. Date: Aug. 3, 2017

(65) Prior Publication Data
US 2019/0029244 A1    Jan. 31, 2019

Related U.S. Application Data (60) Provisional application No. 62/288,888, filed on Jan. 29, 2016.

(51) Int. Cl.
*A01M 1/06* (2006.01)
*A01M 23/00* (2006.01)
*A01M 1/10* (2006.01)
*A01M 23/18* (2006.01)

(52) U.S. Cl.
CPC ............... *A01M 1/06* (2013.01); *A01M 1/10* (2013.01); *A01M 23/00* (2013.01); *A01M 23/18* (2013.01)

(58) Field of Classification Search
None
See application file for complete search history.

(56) References Cited

U.S. PATENT DOCUMENTS

| 4,741,121 A | * | 5/1988 | Pratscher | A01M 23/12 43/58 |
| 2011/0078940 A1 | * | 4/2011 | Gauker | A01M 23/30 43/61 |
| 2015/0020436 A1 | * | 1/2015 | James | A01M 23/14 43/58 |

FOREIGN PATENT DOCUMENTS

| WO | WO-2008121011 A2 | 10/2008 |
| WO | WO-2016055804 A1 | 4/2016 |

OTHER PUBLICATIONS

International Search Report and Written Opinion dated Mar. 28, 2017 for PCT Application No. PCT/GB2017/050230.

* cited by examiner

*Primary Examiner* — Richard G Davis
(74) *Attorney, Agent, or Firm* — Rumit Ranjit Kanakia (57) ABSTRACT

There is herein described an insect and animal trapping device. More particularly, there is described an insect and/or animal trapping device such as a rat-trapping device wherein there is a receptacle which is capable of trapping the insect and/or animal and thereafter having the air inside the receptacle at least partially removed thereby killing the insect and/or animal.

12 Claims, 8 Drawing Sheets

ND ANIMAL TRAPPING DEVICE

FIELD OF THE INVENTION

The present invention relates to an insect and animal trapping device. More particularly, the present invention relates to an insect and/or animal trapping device such as a rat-trapping device wherein there is a receptacle which is capable of trapping the insect and/or animal and thereafter having the air inside the receptacle at least partially removed thereby killing the insect and/or animal.

BACKGROUND OF THE INVENTION

Although there are many prior insect and animal trapping devices, there remains the issue that many prior art devices do not kill the insect or animal in a humane manner. This thereby causes suffering to the insect or animal when it is trapped prior to death and also during death.

It is an object of at least one aspect of the present invention to obviate or mitigate at least one or more of the aforementioned problems.

It is a further object of at least one aspect of the present invention to provide an insect and/or animal trapping device which provides an improved method for trapping the insect and/or animal and also to provide a more humane method for killing the insect and/or animal via the removal of breathable air.

SUMMARY OF THE INVENTION

According to a first aspect of the present invention there is provided a rat, animal and/or insect trapping device comprising:
 a receptacle capable of holding a rat, animal and/or insect;
 a first sealable opening through which a rat, animal and/or insect is capable of entering the receptacle;
 a device for removing air once a rat, animal and/or insect is trapped inside the receptacle; and
 wherein the rat, animal and/or insect is killed by removing air from the enclosure and wherein there is a decompression level of at least negative 0.6 Bar in the receptacle.

The receptacle may be any suitable type of carcass in the form of a sealable chamber. Preferably, the sealable chamber is in the form of a cylinder or oval wherein there are no edges upon which a trapped animal may gain purchase and attempt to escape. The receptacle may be manufactured from any suitable material such as any form of plastic, glass fibre reinforced plastic, metal, alloy or any other robust material.

It is therefore preferred that the inside surface of the receptacle where the rat/animal and/or insect is trapped is tunnel-like and may preferably be formed with curved corners.

The trapping device of the present invention may therefore be hermetically sealed therefore forming an air-tight seal. This may be achieved by a first sealable opening by having a door which may be opened and closed. The door may be spring-loaded and may also comprise a magnet which helps to perform the function of the door by opening the door and closing the door. The door may also comprise a counter-weight on the bottom to assist with the opening and closing function.

The door may be hinged and is preferably operated electrically and controlled via a PCB electronic mechanism. Once the rat, animal and/or insect is detected in the receptacle, the door may be closed using a spring-loaded/electrical device. The sealable opening would therefore be secured shut using, for example, a magnetic lock.

The sensor and any other electrical components in the trapping device may be either connected to the main supply or may be powered by a battery such a rechargeable battery or standard batteries.

The receptacle may also comprise a second sealable opening through which a person is capable of viewing the trapped rat, animal and/or insect. The second sealable opening may be in the form of a clear plastic viewing window. The function of the second sealable opening may be that a trapped rat, and/or insect cannot see out but that a user is capable of sliding a top cover aside to see if an animal has been trapped.

The device for removing air may be in any suitable form but in a particular embodiment may be a one-way (non-return) valve. Alternatively, a one-way air valve may be used for gradually removing air from the inside of the receptacle. The receptacle therefore forms an air-tight seal therefore allowing the receptacle to become hermetically sealed on removal of the air. The gradual removing of the air allows the trapped rat, animal and/or insect to have a slow but ensured loss of consciousness. Continual and gradual removal of the air (decompression/gradual hypoxia) in the sealed chamber thereby allows the trapped rat, animal and/or insect to die painlessly and without stress. The method of death proposed by the present application therefore provides a much more humane approach than currently known methods. The trapping device may also comprise an electric sensor which is capable of being activated once an animal enters the chamber. When activated, the sensor sends a signal which in turn is deactivated.

The chamber of the present invention wherein the rat, animal and/or insect is trapped may be used to trap multiple animals.

In use, the user may activate the device by creating a vacuum in the chamber to the prescribed pressure necessary and holds the pressure for the correct time until animals have been euthanised. Upon completion, the machine advises the operator that the action is complete and the retaining handle may be automatically released. The euthanised animals can therefore safely be removed. The internal chamber may also be cleaned using a neutralising liquid.

Typically, the decompression level to perform the killing function of the apparatus may be at a level of at least about −0.38 Bar. Preferably the decompression level may be at least about −0.6 Bar, about −0.7 Bar or most preferably at least about −0.8 Bar. Alternatively, the pressure may be −0.38 Bar to −0.88 Bar, −0.6 Bar to −0.88 Bar or −0.7 Bar to −0.88 Bar. By 'Bar' in the present application means 'gauge' pressure where a full vacuum is −1 Bar. Thus anything between 0 and 1 Bar is measured in a minus (e.g. −0.8 Bar.)

It has been found that a pressure of at least negative 0.6 Bar is required to allow a relatively quick and stress free death for the trapped rat, animal and/or insect.

BRIEF DESCRIPTION OF THE DRAWINGS

Embodiments of the present invention will now be described, by way of example only, with reference to the following drawings in which.

BRIEF DESCRIPTION

Generally speaking the present invention resides in the provision of an insect and/or animal-trapping device which on removal of air from a receptacle which is capable of trapping an insect and/or animal provides a more humane procedure for killing the insect and/or animal.

Figure 1:
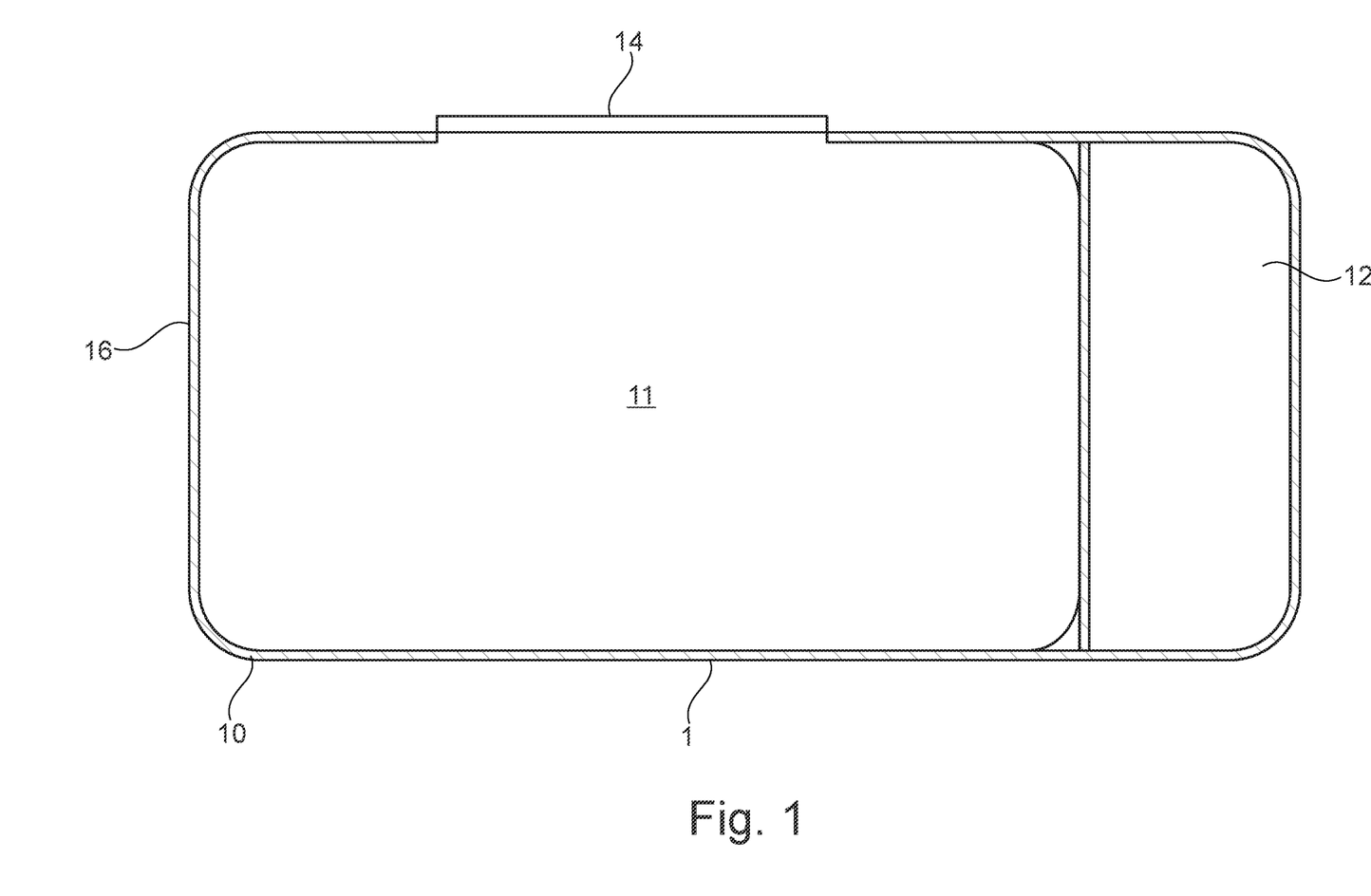
FIGS. 1 to 4 are representations of an insect and/or animal trapping device according to an embodiment of the present invention.

FIG. 1 is a representation of a first embodiment of the present invention which shows a main chamber 11 located within an outer chamber 10. The outer chamber 10 may be made from polished stainless-steel or any other suitable material. As shown, the device also comprises a vacuum pump and electronic controls 12 along with a hermetically sealed door 14 which opens and closes. The device also contains a clear viewing panel 16 to the main chamber 11.

Figure 2:
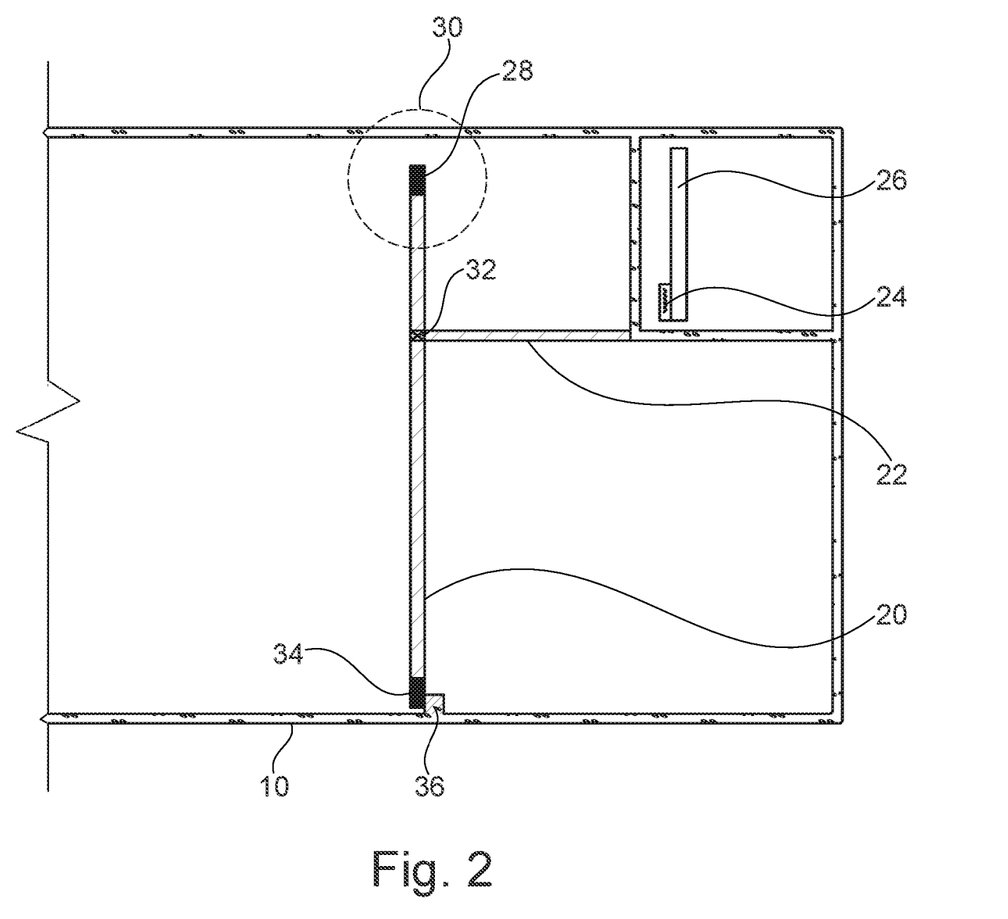

FIG. 2 shows the feature of a tunnel within a tunnel apparatus. A rat/animal/insect may enter the device from the right hand side. On entry of the rat/animal/insect the door 20 which may be a perforated metal door may swing into the chamber 11. At the bottom of the door 20 there may be a counter-weight 34 built into the bottom of the door 20. At the upper end of the door 20 the door may be tension sprung via a door hinge 32 which helps the door 22 to return to the closed position once the rat/animal/insect has entered the main chamber 11. In the device there is a perforated metal tunnel casing 22 and a reed switch or Hall Effect switch 24 which is connected to printed circuit board (PCB) 26 containing all the electrics and transmitter for the apparatus all of which may be water proof-coated.

The apparatus may also comprise a magnet 28 attached to the door 20 which creates a magnetic field 30 to assist with the operation of the door.

Figure 3:
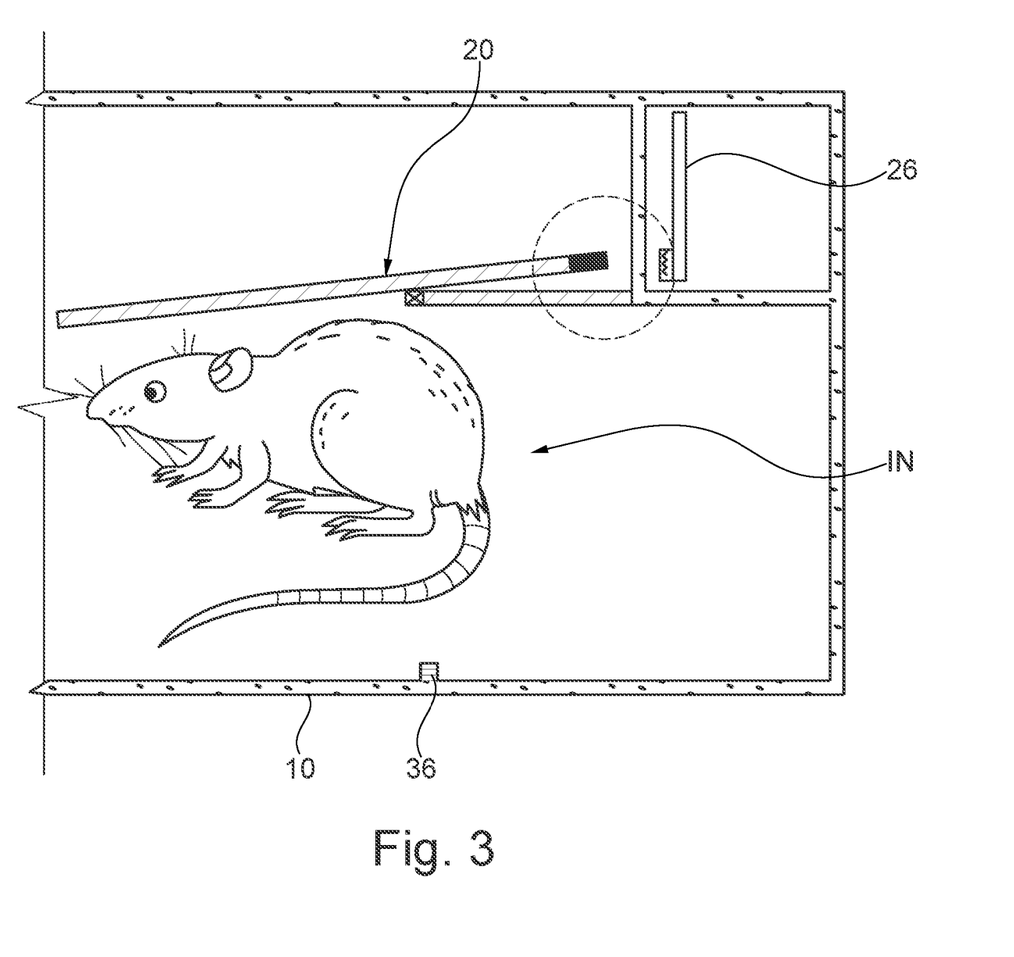

FIG. 3 shows a rat entering the device whereupon the door 20 has swung to the open position. As shown there is also a door stop 36 which prevents the door 20 from swinging the opposite way and therefore returning to the required position.

Figure 4:
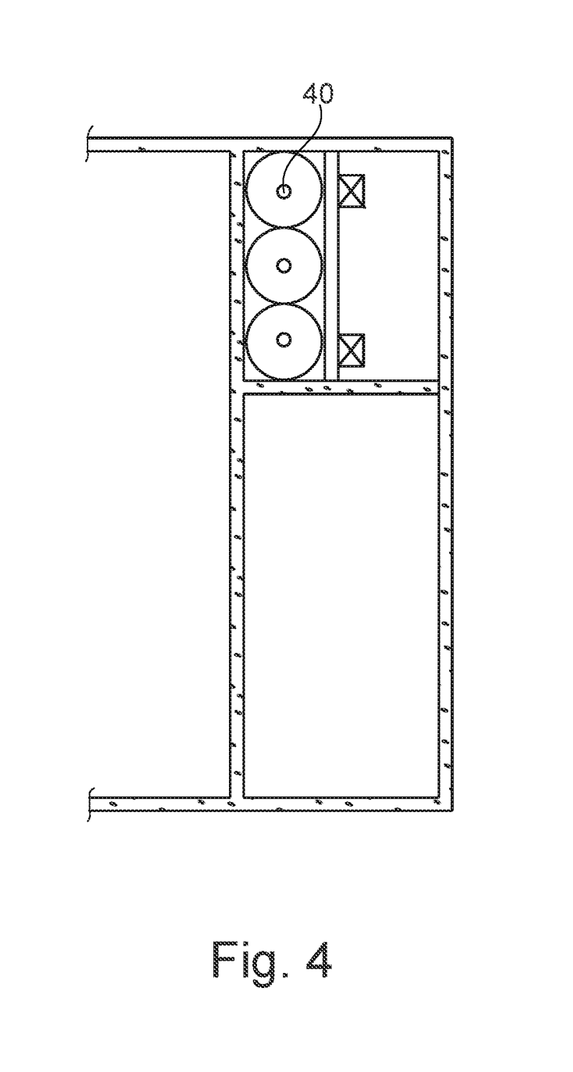

FIG. 4 shows the batteries 40 of the device which are contained within a water tight compartment.

FIGS. 5 to 8 represent a further embodiment of the present invention.

As previously indicated, the concept of the present device is to allow a rat/animal/insect to enter a chamber by pushing against a door 116 that can easily swing in an upward direction. The door 116 may be made from perforated metal or from perforated reinforced plastic. Additionally, the door 116 may be spring loaded or counter-weighted as previously described. The door 116 therefore allows the rat/animal/insect to enter the main chamber containing the food bait.

A further feature of the present invention is that the internal faces of the chamber where the rat/animal/insect is trapped has no points/edges upon which an animal can gain any purchase to gnaw (i.e. damage) the tunnel and escape.

The access tunnel within the chamber and the swing door may be manufactured from perforated metal or glass reinforced plastic or any other suitable durable material.

Once a rat/animal/insect has entered the chamber the door 116 automatically swings back to the closed position helped to do this by either a counter weight built into the bottom of the door or via a torsion spring fitted at the hinge position, or both. This thereby closes the door and traps the animal in the main chamber.

When the door is in the open position, the magnet built into the top of the door swings back to a point near to the reed switch or Hall Effect switch whereby the magnetic field that comes into contact with the switch triggering the electrics on the printed circuit board, sends a message via a transmitter to the operator advising that a rat/animal/insect has been captured.

Although not shown, an external (rubber) antenna can be used to increase the radio signal (around 5 to 10 kilometres under ideal conditions) that can be activated by a Wi-Fi, GSM or GPRS depending on the area and mode of use and using existing wireless protocols or independent or long range and Mesh capabilities as necessary.

The design of the electric features includes:
 a facility to provide initial set up so that the users can enter local SSID and passwords as required;
 a web based area that they can then "register" their trap;
 an initial communication when set to check functionality;
 instant notification if triggered (website/phone/tablet);
 heart beat every 24 hours (configurable) to ensure communications are maintained. Loss of which alerts the user;
 The microchip in the PCB has a location sensor that can be used to locate the trap if it is stolen.

The electronics design of the apparatus according to the present invention may therefore be in two parts: the transmitter and the controller. It is the job of the transmitter to send whatever information the controller wishes whilst the controller interacts with the trap to determine status.

The controller may be part of the micro-chip PIC family of 12F micro-controllers as these have outstanding capabilities in respect of cost, power consumption and on chip specifications. The chip chosen, whilst only having five ports, 1024 bytes of ROM and 64 bytes of RAM can be maximised by multiplexing and judicious coding. Called Macro's for recurring functions further reduces program size. Crucially it also has sleeping instructions.

Figure 5:
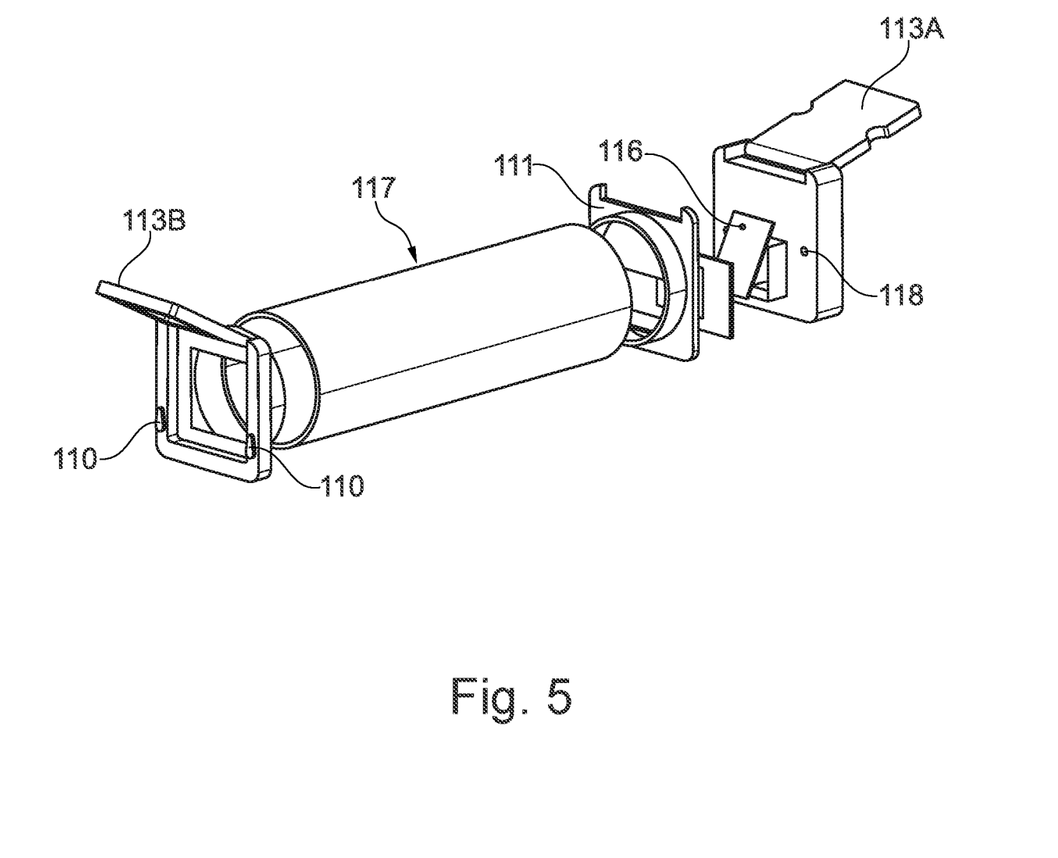
FIGS. 5 to 8 are representations of an insect and/or animal-trapping device according to a further embodiment of the present invention.

FIG. 5 therefore shows the apparatus and the tube 117 used therein. The opening of the device shown in FIG. 7 may be of any suitable size but a preferred embodiment may be 60 mm×60 mm which may be larger or smaller in size to suit the size of rat/animal/insect intended to be captured.

Figure 7:
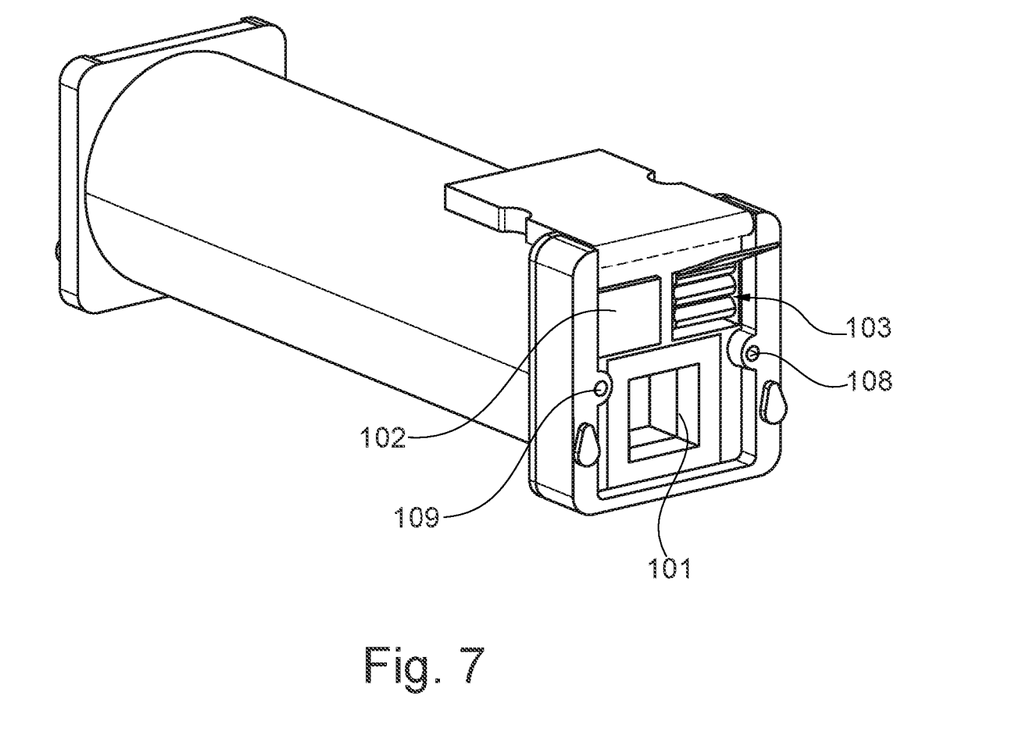

FIG. 7 also shows the electronics compartment 112 which may be used to house the PCB and other electronic control elements. The battery compartment 113 houses the power for driving the electronics.

Figure 6:
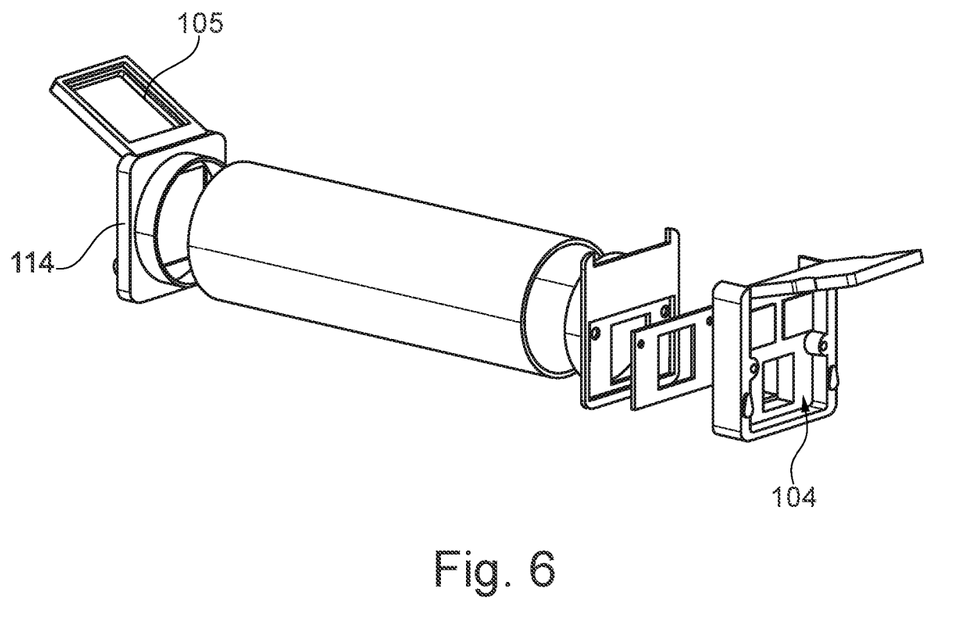

FIG. 6 shows that there are seals 104 which may be about 5 mm or any other suitable size. The seals 104 may be made from neoprene rubber or other plastic, cork, grease, PTFE sealing ring tape, PTFE resin tape, O-ring of any type, Neoprene sponge gases, PTFE gaskets, Viton gaskets, Klingersill gaskets, Novus gaskets, Silicone gaskets, FEP gaskets, Cork gaskets, Nylon gaskets, Foam gaskets, Rubber gaskets, Neoprene gaskets, EPDM gaskets, Nitrile gaskets, Silicone sponge gaskets, Vulcanised fibre gaskets, Ceramic paper gaskets and other hermetic sealing systems.

FIG. 6 also shows the viewing panel 105 which can be injection moulded into the plastic door 116. The door may be laser cut from clear acrylic or any other sheet type material such as polycarbonate. The surface of the panel can be polished for clarity.

The tube of the device may be plastic (of any type) or of glass fibre reinforced plastic or metal or any other robust material and may be circular or oval in shape. The size of the internal chamber may be of a diameter of about 150 mm with an external diameter of about 160 mm. Obviously, the size of the tube 117 may be adapted to suit the size of the rat/animal/insect intended to be captured.

FIG. 5 shows that there is also a quick release non-return air valve 118 which may be of any type and can be used to draw air from the chamber.

FIG. 7 shows that there may also be an air equaliser valve (of any type) which may be used to return air to the chamber to equalise air pressure within and to equalise normal atmospheric pressure.

Figure 8:
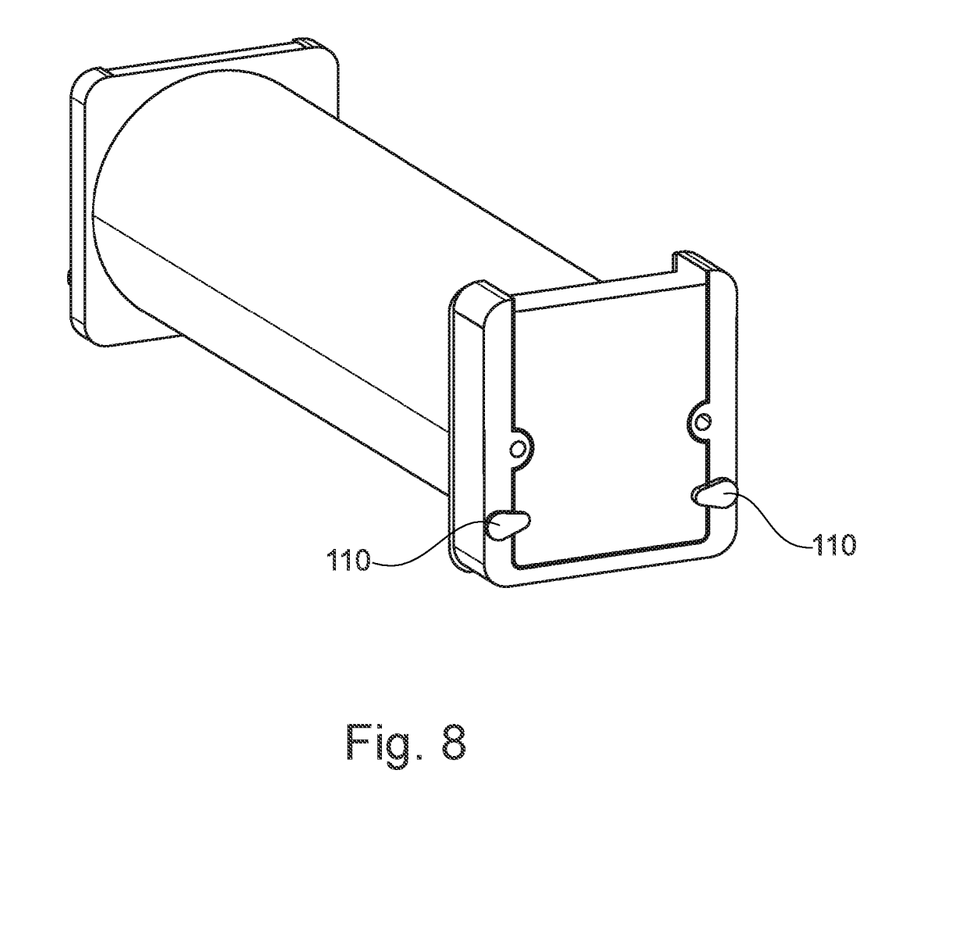

FIGS. 5 and 8 also show that there may also be a fast lead captive screw or spring loaded plunger or swell action latch or any other type of quick access fastener 110 which secures the door tightly on either end of the carcass of the device to the seal 114. This therefore forms an air-tight hermetic seal preventing air being drawn from the chamber.

FIG. 5 also shows that there is an end panel 111 glued to the tubular chamber 117. The end panel 111 can therefore create an air-seal between this and the end panel 112.

FIG. 5 also shows that there is a hinged door 113A which is manufactured from injection moulded plastic or fibre glass reinforced plastic or laser cut acrylic or other plastic or metal materials. On closing the hinged door 113A this then forms an air-tight seal around the opening. The hinge door 1136 with a clear panel or a one way mirror when closed also forms an air-tight seal. FIG. 6 shows that there is an end panel 114 that contains/incorporates door seals 104 that seals the door. The end panel 114 may be transparent or may incorporate a one-way mirror.

A further feature of the present invention is the determination of the required pressure that humanely kills the rat/animal/insect by removal of breathable air from the chamber of the apparatus. It has been found that a decompression level of negative 0.8 Bar provides very positive results with, for example, rats loosing blink reflex in less than 45 seconds in a range of trials. During such tests, the loss of breathing took no longer than about 46 seconds for rats and the loss of heart rate took no longer than 96 seconds. In addition, a post-mortem was carried out on each rat to look for any gross injuries (primarily on the lungs) and none were detected on any of the rats. It can therefore be determined that the rats were humanely killed. In this regard, we refer to the results below in table 1 which determine that a decompression level of negative 0.8 Bar would kill an anaesthetised rat without causing gross injuries.

TABLE 1

Anaesthetised trials:
Table 1: Results for anaesthetised trials at −0.8 Bar

| Rat No | Sex | Weight (g) | Anaesthetised or fully conscious | Max pressure (Bar) | Time to reach max pressure (sec) | Time to loss of eye reflexes (sec) | Time taken to loss of respiration (sec) | Time taken to first loss of heartbeat (sec) | Any gross injuries (yes/no) |
|---|---|---|---|---|---|---|---|---|---|
| Ratagon03 | M | 272 | Anaesthetised | −0.8 | 29 | <22 | 10 | 62 | No |
| Ratagon04 | M | 403 | Anaesthetised | −0.8 | 33 | <14 | 14 | 48 | No |
| Ratagon05 | M | 369 | Anaesthetised | −0.8 | 32 | <44 | 44 | 73 | No |
| Ratagon06 | M | 330 | Anaesthetised | −0.8 | 32 | <43 | 43 | 74 | No |
| Ratagon07 | M | 313 | Anaesthetised | −0.8 | 31 | <13 | <13 | 90 | No |
| Ratagon08 | M | 355 | Anaesthetised | −0.8 | 30 | 21 | 27 | 96 | No |
| Ratagon09 | M | 310 | Anaesthetised | −0.8 | 30 | Na | 29 | 73 | No |
| Ratagon10 | M | 362 | Anaesthetised | −0.8 | 31 | Na | 23 | 64 | No |
| Ratagon11 | M | 358 | Anaesthetised | −0.8 | 30 | 36 | 36 | 71 | No |
| Ratagon12 | M | 382 | Anaesthetised | −0.8 | 30 | 46 | 46 | 70 | No |

Note:
Rat no Ratagon09 & Ratagon10 had no blink reflex at beginning of trial due to deep anaesthesia The loss of eye (blink) reflex and therefore consciousness range from under 13 seconds to 46 seconds for when a vacuum pump was turned on although this may be due to the rats sleeping deeper under anaesthesia. The loss of respiration ranged from below 13 seconds to 46 seconds and loss of heartbeat ranged from 48 seconds to 96 seconds. All rats underwent a post-mortem and no gross injuries were found in any of the rats. We also refer to table 2 below which shows results for anaesthetised trials at other decompression levels.

TABLE 2

| Rat No | Sex | Weight (g) | Max pressure (Bar) | Time to reach max pressure (sec) | Time to loss of eye reflexes (sec) | Time taken to loss of respiration (sec) | Time taken to first loss of heartbeat (sec) | Any gross injuries (yes/no) |
|---|---|---|---|---|---|---|---|---|
| Ratagon01 | M | 347 | −0.4 | 28 | >1200 | >1200 | >1200 | No |
| Ratagon02 | M | 377 | −0.6 | 29 | 83 | 543 | 543 | No |
| Ratagon19 | M | 330 | −0.7 | 28 | 150 | >1200 | >1200 | No |

It can therefore be observed that the decompressional level when set at both −0.4 Bar and −0.7 Bar the rats were still alive and breathing after 20 minutes. At a decompression level of −0.6 Bar there was loss of respiration and heart rate just after nine minutes.

In view of the above, it can therefore be seen that the highly preferred decompression level is of −0.8 Bar to provide a quick and humane death for rats.

Whilst specific embodiments of the invention have been described above it will be appreciated that departure from the described embodiments may still fall within the scope of the present invention. For example, any suitable device for removing breathable air from a device may be used such that the required pressure is obtained that allows a rat/animal/insect to be humanely killed.

What is claimed is:

1. A rat, animal and/or insect trapping device, comprising:
   a receptacle to hold and trap a rat, animal and/or insect;
   a first sealable opening coupled to the receptacle to enable a rat, animal and/or insect to enter the receptacle; and
   a device coupled to the receptacle to remove air once a rat, animal and/or insect is trapped inside the receptacle,
   wherein the device is configured to remove air from the receptacle allowing decompression to occur and graduated hypoxia of the trapped rat, animal and/or insect inside the receptacle, and
   wherein air is gradually removed to enable a rat, animal and/or insects to die painlessly and without stress in about not more than 96 seconds at a decompression level is in range of −0.7 Bar to −0.88 Bar in the receptacle.

2. The rat, animal and/or insect trapping device according to claim 1, wherein the receptacle is in the form of a sealable chamber.

3. The rat, animal and/or insect trapping device according to claim 1, wherein the receptacle is in the form of a cylinder or oval, and wherein the receptacle has no edges to enable a trapped animal to gain purchase and attempt to escape.

4. The rat, animal and/or insect trapping device according to claim 1, wherein the receptacle is of a robust material including a plastic, a glass fibre reinforced plastic, a metal, and alloy.

5. The rat, animal and/or insect trapping device according to claim 1, wherein the receptacle is configured to be hermetically sealed to form an air-tight seal.

6. The rat, animal and/or insect trapping device according to claim 1, wherein the first sealable opening is in the form of a door to be opened and closed.

7. The rat, animal and/or insect trapping device according to claim 1, wherein the first sealable opening is in the form of a door to be opened and closed and, the door is spring-loaded and further comprises a magnet and a counter-weight on the bottom to assist with opening and closing of the door.

8. The rat, animal and/or insect trapping device according to any of claim 1, wherein the first sealable opening is in the form of a door to be opened and closed and, the door is operated electrically and controlled via a PCB electronic mechanism and once the rat, animal and/or insect is detected in the receptacle, the door is closed and secured shut using a magnetic lock.

9. The rat, animal and/or insect trapping device according to claim 1, wherein the device comprises a sensor to detect when a rat, animal and/or insect is trapped.

10. The rat, animal and/or insect trapping device according to claim 1 further comprising electrical components connected to one of a main power supply or a battery to be powered, wherein the battery is a rechargeable battery or standard batteries.

11. The rat, animal and/or insect trapping device according to claim 1, wherein the receptacle further comprises a second sealable opening to enable a person to view the trapped rat, animal and/or insect inside the receptacle.

12. The rat, animal and/or insect trapping device according to claim 1, wherein the receptacle further comprises a second sealable opening to enable a person to view the trapped rat, animal and/or insect, the second sealable opening is in the form of a clear plastic viewing window having a function to block a trapped rat, animal and/or insect to see out, but enables a user to slide a top cover aside to see if an animal is trapped.

* * * * *